: US010526851B2

United States Patent
Millet

(10) Patent No.: US 10,526,851 B2
(45) Date of Patent: Jan. 7, 2020

(54) CONNECTING ELEMENT FOR A TUBULAR COMPONENT OVERLAID WITH A METALLIC COMPOSITE DEPOSIT AND METHOD OF OBTAINING SUCH ELEMENT

(71) Applicants: VALLOUREC OIL AND GAS FRANCE, Aulnoye-Aymeries (FR); NIPPON STEEL CORPORATION, Chiyoda-ku (JP)

(72) Inventor: Cecile Millet, La Longueville (FR)

(73) Assignees: VALLOUREC OIL AND GAS FRANCE, Aulnoye-Aymeries (FR); NIPPON STEEL CORPORATION, Chiyoda-ku (JP)

( * ) Notice: Subject to any disclaimer, the term of this patent is extended or adjusted under 35 U.S.C. 154(b) by 0 days.

(21) Appl. No.: 15/023,605

(22) PCT Filed: Sep. 11, 2014

(86) PCT No.: PCT/EP2014/069362
§ 371 (c)(1),
(2) Date: Mar. 21, 2016

(87) PCT Pub. No.: WO2015/049097
PCT Pub. Date: Apr. 9, 2015

(65) Prior Publication Data
US 2016/0208562 A1    Jul. 21, 2016

(30) Foreign Application Priority Data
Oct. 2, 2013  (FR) ...................................... 13 59528

(51) Int. Cl.
*F16C 33/20* (2006.01)
*F16C 33/12* (2006.01)
(Continued)

(52) U.S. Cl.
CPC ......... *E21B 17/042* (2013.01); *C10M 103/02* (2013.01); *C10M 103/04* (2013.01);
(Continued)

(58) Field of Classification Search
CPC .......................... C10M 103/04; C10M 103/06
(Continued)

(56) References Cited

U.S. PATENT DOCUMENTS

2002/0092808 A1 *   7/2002   Lauritzen ................ E21B 43/08
                                                         210/497.01
2007/0264491 A1    11/2007   Asano et al.
(Continued)

FOREIGN PATENT DOCUMENTS

DE    44 34 303 A1     4/1995
EP     1 854 909 A2   11/2007
(Continued)

OTHER PUBLICATIONS

K. N. Srinivasan, et al., "Electroless deposition of Ni—P composite coating kaolin nanoparticles," Transactions of the Institute of Metal Finishing, vol. 90, No. 2, XP001575800, Mar. 1, 2012, pp. 105-112.
(Continued)

*Primary Examiner* — Prem C Singh
*Assistant Examiner* — Francis C Campanell
(74) *Attorney, Agent, or Firm* — Oblon, McClelland, Maier & Neustadt, L.L.P.

(57) ABSTRACT

A connecting element for a tubular component, the connecting element being overlaid with a coating including a principal layer constituted by a nickel-phosphorus alloy, a tubular component including one or more such connecting elements, and a method for producing such a connecting element.

19 Claims, 1 Drawing Sheet

(51) Int. Cl.
| | |
|---|---|
| *B22F 7/04* | (2006.01) |
| *B22F 7/08* | (2006.01) |
| *E21B 17/042* | (2006.01) |
| *C10M 103/06* | (2006.01) |
| *C23C 18/16* | (2006.01) |
| *F16B 33/00* | (2006.01) |
| *F16L 58/18* | (2006.01) |
| *F16L 15/00* | (2006.01) |
| *C10M 103/02* | (2006.01) |
| *C10M 103/04* | (2006.01) |
| *C23C 18/36* | (2006.01) |
| *C10M 107/38* | (2006.01) |

(52) U.S. Cl.
CPC ........ *C10M 103/06* (2013.01); *C10M 107/38* (2013.01); *C23C 18/1651* (2013.01); *C23C 18/1662* (2013.01); *C23C 18/1692* (2013.01); *C23C 18/36* (2013.01); *F16B 33/008* (2013.01); *F16L 15/004* (2013.01); *F16L 58/182* (2013.01); *C10M 2201/0413* (2013.01); *C10M 2201/053* (2013.01); *C10M 2201/0613* (2013.01); *C10M 2201/0623* (2013.01); *C10M 2201/0653* (2013.01); *C10M 2201/0663* (2013.01); *C10M 2201/1033* (2013.01); *C10M 2213/0623* (2013.01); *C10N 2220/082* (2013.01); *C10N 2240/22* (2013.01); *C10N 2250/08* (2013.01); *C10N 2280/00* (2013.01)

(58) Field of Classification Search
USPC .................................. 508/100, 103; 428/565
See application file for complete search history.

(56) References Cited

U.S. PATENT DOCUMENTS

| | | | |
|---|---|---|---|
| 2009/0017317 A1* | 1/2009 | Lancsek | C23C 18/31 |
| | | | 428/457 |
| 2009/0286104 A1* | 11/2009 | Tysoe | C23C 18/1651 |
| | | | 428/634 |
| 2010/0279145 A1 | 11/2010 | Asano et al. | |
| 2011/0162751 A1* | 7/2011 | Fitzgerald | C23C 30/00 |
| | | | 138/145 |
| 2011/0203791 A1 | 8/2011 | Jin et al. | |
| 2013/0177777 A1 | 7/2013 | Cao | |
| 2016/0244883 A1* | 8/2016 | Millet | C23C 18/1651 |

FOREIGN PATENT DOCUMENTS

| | | |
|---|---|---|
| JP | 58-193355 A | 11/1983 |
| JP | 5-71525 A | 3/1993 |

OTHER PUBLICATIONS

International Search Report dated Jan. 21, 2015 in PCT/EP2014/069362, filed Sep. 11, 2014.

* cited by examiner

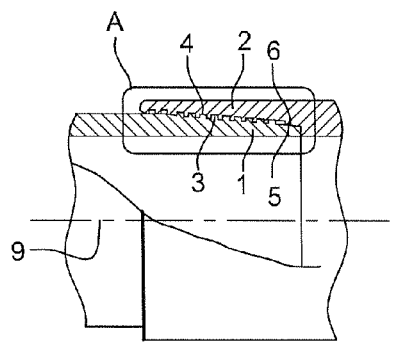
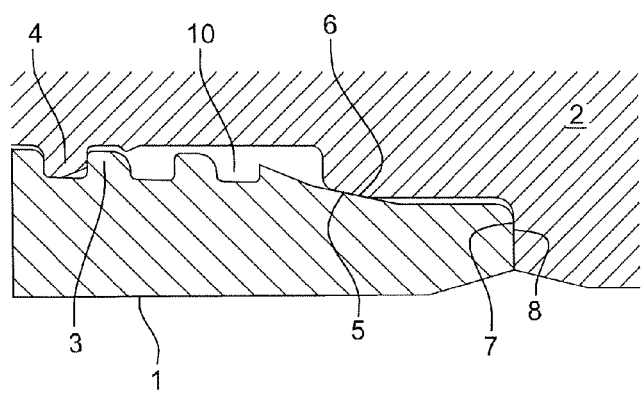
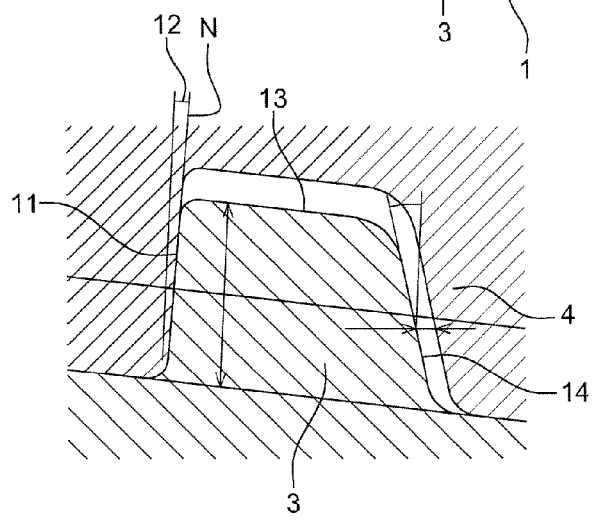
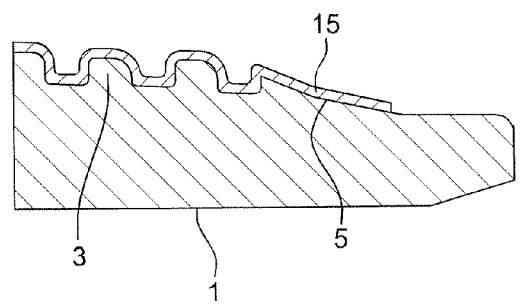

CONNECTING ELEMENT FOR A TUBULAR COMPONENT OVERLAID WITH A METALLIC COMPOSITE DEPOSIT AND METHOD OF OBTAINING SUCH ELEMENT

The present invention relates to a connecting element for a tubular component, said connecting element being overlaid with a particular metallic composite coating.

The term "tubular component" as used in the present invention means any element or accessory used to drill or operate a well.

The term "connecting element" as used in the context of the present invention means any end element of a tubular component which participates in connecting the tubular component with another tubular component.

A tubular component is intended to be connected, via one or more connecting elements, in particular a threading, a sealing surface and an abutment shoulder, to another tubular component in order to constitute a threaded tubular connection with that other tubular component. The tubular component may, for example, be a relatively great-length tube (in particular approximately ten meters in length), a tubular coupling a few tens of centimeters in length, an accessory for such tubes (a suspension device or hanger, a part for adapting cross-sections, or cross-over, a safety valve, a drill pipe connector or tool joint, a sub, and the like).

The tubular components are generally connected one with another for dropping into the hydrocarbon well or similar well and to constitute a drill stem, a casing string or a liner or tubing string, or indeed an operating string.

API specification 5CT issued by the American Petroleum Institute (API), equivalent to ISO standard 11960:2004 issued by the International Standardisation Organisation (ISO) governs the specifications for tubes used as casing or tubing, and API specification 5B defines standard threadings for such tubes. API specification 7 defines threaded connectors with a shoulder for rotary drill pipes.

The manufacturers of tubular components with threaded connections have also developed threaded connections known as premium connections which have threadings with specific geometries and specific means for providing better performance in service, in particular in the matter of mechanical strength and sealing. Examples of such premium threaded connections and those specific means are described, for example, in patent documents EP 1 631 762, U.S. Pat. Nos. 7,334,821, 7,997,627, 7,823,931, US-2010/0301603, US-2011/0025051, U.S. Pat. Nos. 7,900,975, 8,038,179, US-2011/241340, EP 0 488 912, EP 0 767 335, EP 1 269 060 and U.S. Pat. No. 4,494,777, EP 2501 974 and WO-2012/025461.

These threaded ends, as well as the bearing surfaces and abutment shoulders, are machined very precisely in order to comply with the profiles and geometries required to reach the requisite performances.

Thus, it is vital that these ends, which have been very finely and carefully machined, are damaged, polluted and deteriorate as little as possible between the time they leave their production line and the time they are put into use, but also between two successive uses. It will be understood that it is in fact necessary to protect not only the threading, but also any bearing surface(s) and abutment shoulder(s) which each have functions which are specific and complementary to those of the threadings and which together provide an effective seal when in use against shocks (knocks), corrosion and dust.

The first desired quality for the connecting elements is hardness.

In particular, the abutment shoulders are exposed to knocks and impacts generated during handling of tubular components in particular when being stored on the drilling platform (rig) or on a base or during the operation when the male portion and the female portion, in particular the threadings, of the tubular components are brought into contact before makeup (stabbing operation).

In addition, the abutment shoulders have to be capable of tolerating mechanical loads in terms of compression, tension and torsion during operation.

Thus, hardness is an essential property for abutment shoulders.

The threadings must also have good properties in terms of hardness. In fact, the threadings must have good galling protection properties. Increasing the surface hardness allows to protect the threading from galling.

In addition, increasing the hardness allows to prevent the transfer of material from one surface to another.

Finally, the threadings must not wear during makeup and breakout operations.

The sealing surfaces must also have sufficient hardness, in particular because the sealing surfaces are responsible for the seal of the connection for the tubular components. In fact, a sealing surface is a surface which is generally tapered in shape, located on the end of a first tubular component which, when two tubular components are connected together via their respective ends, is caused to exert a pressure on the sealing surface of the end of a second component. These two tapered surfaces in contact and under pressure can be used to create a seal and prevent the passage of fluids between a zone termed an internal zone of the connected tubular components and a zone which is external of the connected tubular components. These components may be used when connected to participate in extracting oil from a well, and inside these wells, and thus inside the components, there may be a column of liquid under very high pressure.

The connecting elements must also perform well in terms of corrosion resistance and lubricating properties.

In particular, the elements of the connection can be stored for several years before being used, sometimes in highly aggressive environments.

Lubricating properties are particularly important for the threadings. The abutment shoulders also have to be lubricated, but to a lesser extent than the threadings.

The threadings should also be protected against galling, in particular during makeup and breakout operations. In fact, at the well, the threadings have to be able to undergo several makeup and breakout cycles. Makeup operations are carried out vertically under a high axial load, for example the weight of a tube several meters in length (typically 10 to 13 meters) to be connected vertically via the threaded connection, which gives rise to galling risks, in particular in the threadings. This load may also be localized due to a slight misalignment in the axes of the threaded elements to be connected because the tube to be connected is suspended vertically, increasing the risks of galling.

The connecting elements for the tubular components cited above are generally coated with an anti-corrosion grease which is removed just before they are connected. Before such connection, the anti-corrosion grease is removed and a lubricating grease is added (the operation is known as rig preparation). However, prior art greases suffer from a certain number of disadvantages linked to their amount of toxic constituents, to the pollution they generate and to the number of prior steps necessary before being able to drop a component into the well. In particular, cleaning of the anti-corrosion grease (also known as storage grease) is traditionally carried out with a high pressure water jet. The operation is lengthy, dirty, might contaminate other connections in the vicinity and necessitates using holding and re-processing tanks for the effluents in order to comply with environmental standards.

Patent documents U.S. Pat. No. 6,027,145, EP 1 211 451 and EP 1 934 508 disclose that it is known to apply a dry lubricant comprising solid lubricant particles at the factory. In these cases when a dry lubricant is used at the factory, it is then necessary to protect the layer of lubricating product with which the ends of the components is coated as much as possible, both from mechanical removal and from pollution (sand, debris) which could have a detrimental effect on the efficacy of the lubricating product.

To this end, it is also known that these layers of product, which are applied at the factory as soon as the threaded end has been manufactured, are aimed at providing both anti-corrosion protection of the end during the storage period and lubrication for subsequent makeup of that end, as taught in particular in documents WO 2004/033951 or WO 2008/125740. In particular, lubrication must be able to control the characteristic curve of the makeup torque of the connection in order to guarantee the final seal.

The compositions used may be composed of a multifunctional coating which is both anticorrosive and lubricating, as described in WO 2008/125740 applied to each end to be connected, or to superimposed layers as described in WO 2004/033951, where some are lubricants and others protect against corrosion.

Whatever they are, during makeup, the anti-corrosion elements are mixed with the lubricating elements and will modify the lubricating behaviour which would be observed without them. It has frequently been demonstrated that coupling between these functions is very strong and contradictory. An improvement in the anti-corrosion behaviour of a design generally results in deterioration in the lubricating power and vice versa, an improvement in the lubricating power reduces the corrosion behaviour during storage. The performance of the compromises proposed by the prior art solutions is limited.

Further, the dry anti-corrosion coatings normally used cannot guarantee very long periods of corrosion resistance, in particular in highly aggressive environments (marine environment, industrial environment, high precipitation environment and/or large temperature ranges, for example).

Thus, there is a need for the provision of connecting elements which have good properties in terms of hardness, corrosion resistance and lubrication which do not suffer from the disadvantages of the prior art.

Thus, the invention provides a connecting element for a tubular component, said connecting element being overlaid with a coating comprising a principal layer constituted by a nickel-phosphorus alloy.

The phosphorus generally represents 5% to 13%, preferably 8% to 13%, more preferably 10% to 12%, even more preferably 10.5% to 11.5% by weight of the total weight of the nickel-phosphorus alloy.

In accordance with a first embodiment of the invention, the thickness of the principal layer constituted by the nickel-phosphorus alloy is advantageously in the range 5 to 10 µm. Said thickness allows to provide the hardness required for the connecting element.

In accordance with a second embodiment of the invention, the thickness of the principal layer constituted by the nickel-phosphorus alloy is advantageously 15 to 35 µm, preferably 20 to 35 µm, more preferably 25 to 30 µm. Such a thickness not only allows to provide the hardness required for the connecting element, but also allows to provide protection against corrosion.

Such a nickel-phosphorus alloy layer has been proposed by the company MACDERMID under the trade name NIKLAD XD7647.

In accordance with a preferred embodiment, the coating further comprises an additional layer constituted by a nickel-phosphorus alloy comprising the particles of one or more solid lubricant compounds, said additional layer being disposed on said principal layer.

A solid lubricant is a solid and stable substance which is interposed between two friction surfaces in order to reduce the coefficient of friction and to reduce wear and damage to the surfaces.

These substances can be classified into various categories defined by their functional mechanism and their structure. These categories are described, for example, in the handouts entitled "Les lubrifiants solides [Solid lubricants]" issued by Mr Eric Gard at the École Nationale Superieure des Paroles et Moteurs (France):

class 1: solid substances owing their lubricating properties to their crystalline structure, for example graphite, boron nitride BN or zinc oxide ZnO;

class 2: solid substances owing their lubricating properties on the one hand to their crystalline structure and on the other hand to a reactive chemical element in their composition, for example molybdenum disulphide $MoS_2$, graphite fluoride, tin sulphides or bismuth sulphides;

class 3: solid substances owing their lubricating properties to their chemical reactivity, for example certain chemical compounds of the thiosulphate type (for example Desilube 88 marketed by Desilube Technology Inc.);

class 4: solid substances owing their lubricating properties to a plastic or viscoplastic behaviour under frictional load, for example polytetrafluoroethylene (PTFE) or polyamides.

Silicon carbide and tungsten carbide may also be cited.

The particles of one or more solid lubricant compounds are advantageously selected from particles of polytetrafluoroethylene, talc, mica, boron nitride, silicon carbide, tungsten carbide, tungsten sulphide, molybdenum sulphide and mixtures thereof.

Preferably, the particles of one or more solid lubricant compounds are selected from polytetrafluoroethylene particles.

Advantageously, the phosphorus of the nickel-phosphorus alloy comprising the particles of one or more solid lubricant compounds represents 5% to 13%, preferably 8% to 13%, more preferably 10% to 12% by weight of the total weight of the nickel-phosphorus alloy comprising the particles of one or more solid lubricant compounds.

The particles of one or more solid lubricant compounds advantageously represent 20% to 35% by volume, preferably 25% to 30% by volume with respect to the total volume of the nickel-phosphorus alloy comprising the particles of one or more solid lubricant compounds.

The thickness of said additional layer constituted by a nickel-phosphorus alloy comprising the particles of one or more solid lubricant compounds may be in the range 3 to 13 µm, preferably 5 to 10 µm.

A layer of nickel-phosphorus alloy of this type comprising polytetrafluoroethylene particles has been proposed by the company MACDERMID under the trade name NIKLAD ICE Ultra.

Furthermore, the coating may comprise a lubricant layer disposed on said principal layer or on said additional layer when the coating comprises said additional layer.

The lubricant layer may be selected from a grease, a semi-solid lubricant layer or a solid, dry lubricant layer comprising one or more solid lubricant particles in a resin.

The semi-solid lubricant layer generally comprises one or more extreme pressure additives, one or more solid lubricant particles, one or more metallic soaps and one or more low melting point waxes. Such semi-solid lubricant layers are described, for example, in patent application FR 2 937 046.

The solid, dry lubricant layer generally comprises one or more solid lubricant particles for reducing friction in a resin binder such as an organic or inorganic polymer, selected from heat curable epoxy, polyurethane, unsaturated polyester, polyphenylsulphone, polyimide and silicone resins; thermoplastic polyolefin, olefin copolymer, polyamide, polyamide-imide, polyaryletherketone resins; alkaline polysilicates with a $SiO_2/MxO$ ratio of more than 2, where M=Na, K or Li; organometallics such as alkoxy-titanates or ethyl silicate.

In accordance with a first embodiment, the connecting element of the invention may be a threading.

In accordance with a second embodiment, the connecting element of the invention may be a sealing surface.

In accordance with a third embodiment, the connecting element of the invention may be an abutment shoulder.

The invention also concerns a tubular component comprising one or more connecting elements in accordance with the invention.

More particularly, the tubular component of the invention is produced from steel, in particular steels such as those described in API 5CT standards, for example those comprising carbon in a proportion of less than 0.25%, and/or preferably, steels with a grade such as those defined in the standards ISO11960 and ISO13680 and/or a H40, J55, K55, M65, L80, C90, C95, T95, P110, Q125, carbon steel or a 13Cr or S13Cr or Duplex 22Cr+25Cr or Super-Duplex 25Cr martensitic steel, or a Fe 27Cr austenitic steel.

In accordance with a first embodiment, the tubular component of the invention comprises a threading which is a connecting element in accordance with the invention. In this embodiment, the tubular component of the invention may also comprise an abutment shoulder which is a connecting element in accordance with the invention.

In a second embodiment, the tubular component of the invention comprises an abutment shoulder which is a connecting element in accordance with the invention.

In a third embodiment, the tubular component in accordance with the invention comprises a sealing surface which is a connecting element in accordance with the invention. In this embodiment, the tubular component in accordance with the invention may also comprise a threading which is a connecting element in accordance with the invention and/or an abutment shoulder which is a connecting element in accordance with the invention.

A tubular component of the invention may be connected via one or more connecting elements, which may or may not be in accordance with the invention, in particular a threading, a sealing surface and an abutment shoulder, to another tubular component which may or may not be in accordance with the invention, to form a threaded tubular connection.

In particular, at one of its ends, the tubular component has a threading formed on its outer or inner peripheral surface depending on whether the threaded end is male or female in type, this threading allowing the component to be connected to a complementary component.

A female tubular component of the invention comprising one or more connecting elements overlaid with a coating constituted by the principal layer and the optional additional layer as defined above may be connected with a male tubular component which is not in accordance with the invention and which comprises one or more connecting elements overlaid only with a lubricant layer as defined above.

A female tubular component in accordance with the invention comprising one or more connecting elements overlaid with a coating constituted by the principal layer, the optional additional layer and the lubricant layer as defined above may be connected with a male tubular component in accordance with the invention and which comprises one or more connecting elements overlaid with a principal layer and an optional additional layer as defined above.

A female tubular component in accordance with the invention comprising one or more connecting elements overlaid with a coating constituted by the principal layer, the optional additional layer and the lubricant layer as defined above may be connected with a male tubular component in accordance with the invention and which comprises one or more connecting elements overlaid with a principal layer, an optional additional layer and a lubricant layer as defined above.

Using the connecting elements in accordance with the invention and tubular components in accordance with the invention means that the steps for cleaning and lubrication of the connections before use can be dispensed with (rig ready solution). The coating used in accordance with the invention is highly adhesive and not deformable, and so avoids using specific protectors specially designed to limit damage to the coatings (for example contactless protectors on the threads or a sealed protector).

Protectors are in fact devices which are becoming more and more complicated in order to protect the threads and the connection against corrosion and damage to the coatings. The present invention means that simplified protectors can be used, for example non-sealing protectors or even protectors the manufacturing specifications for which no longer need to be too severe in order to ensure that the contact between the surfaces of the protector and the surfaces of the connection is very good.

The coating used in accordance with the invention has a good level of corrosion resistance by providing cathodic protection of the substrate. The optional presence of particles of lubricant compounds as defined above and which have a low wettability also mean that corrosion resistance is improved.

Finally, the coating used in accordance with the invention does not wear during successive makeup operations. Thus, it can continue to guarantee the anti-corrosion behaviour quality even after several makeup/breakout cycles without necessitating supplemental anti-corrosion protection. In addition, its high wear resistance means that debris or dust which can be observed upon breakout is not generated.

The invention also concerns a method for producing a connecting element as defined above, in which the principal layer and optional additional layer are deposited by autocatalytic deposition.

The principal layer constituted by a nickel-phosphorus alloy used in accordance with the invention may be deposited on the connecting element by autocatalytic deposition. Autocatalytic deposits of nickel-phosphorus alloy are described in NF standard EN ISO 4527, as well as in the document by Louis LACOURCELLE—Nickelage chimique [Chemical nickeling], Techniques de l'Ingénieur, Metallic materials essay.

Autocatalytic deposits of nickel-phosphorus alloy are proposed by the company MACDERMID under the trade name NiKlad™ ELV.

The additional layer optionally used in accordance with the invention, constituted by a nickel-phosphorus alloy comprising particles of one or more lubricant compounds, may be obtained by autocatalytic deposition.

Autocatalytic deposits of nickel-phosphorus alloy containing particles of polytetrafluoroethylene have been proposed by the company MACDERMID under the trade name NiKlad™ ICE ULTRA.

Deposition of the principal layer used in accordance with the invention and of the possible additional layer used in accordance with the invention may be carried out using an autocatalytic method comprising the following steps:

cleaning the surface of the connecting element; cleaning may be carried out by alkaline degreasing, then rinsing, then electrolytic degreasing, then rinsing, then acid stripping, then rinsing; then:

depositing the nickel-phosphorus, then depassivating the surface, then optional deposition of nickel-phosphorus supplemented with particles of lubricant compound, then rinsing; then oven drying, for example at a temperature of the order of 70° C.; then a degassing treatment in an oxidizing atmosphere, typically for 2 h at 220° C.

In accordance with a first embodiment, this method may also include a posterior heat treatment at a temperature which is preferably in the range 250° C. to 300° C., for example for a period of 3 to 5 h.

This posterior heat treatment allows to increase the hardness of the coating and thus of the threading, and to improve the anti-galling performances without, however, deteriorating the corrosion protection performances.

In accordance with a second embodiment, this method may also comprise a posterior heat treatment step carried out at a temperature which is preferably in the range 300° C. to 600° C., for example for a period of 3 to 5 h. In this case, the hardness of the coating is substantially increased, for example from 500 Hk when the method does not comprise this posterior heat treatment step to 800 Hk when it comprises this step, but the corrosion protection performances deteriorate.

Some features of the invention are disclosed in more detail in the following description made with reference to the accompanying drawings:

FIG. 1 is a diagrammatic view of a connection resulting from connecting two tubular components by makeup.

FIG. 2 is an enlarged view of the zone in box A of FIG. 1.

FIG. 3 is a detailed view of the cooperation between the threads of two connected tubular components.

FIG. 4 is a detailed view of a connecting element (threading) of the invention overlaid with a coating.

The threaded connection shown in FIG. 1 comprises a first tubular component with an axis of revolution 9 provided with a male end 1 and a second tubular component with an axis of revolution 9 provided with a female end 2. The two ends 1 and 2 each end in a terminal surface orientated radially with respect to the axis 9 of the threaded connection and are respectively provided with threaded portions 3 and 4 which cooperate together for mutual connection by makeup of the two components. The threaded portions 3 and 4 may be of the trapezoidal or other thread type. In the example shown, the threaded portions have threads with a vanishing profile at the respective ends of the threaded portions. These vanishing profiles extend over a portion of the axial extent of the threaded portion. In particular, a portion of the threaded portion with a vanishing profile 10 does not cooperate with a complementary threading.

In addition, as can be seen in FIG. 2, metal/metal sealing surfaces (bearing surfaces) 5, 6 intended to come into an interference sealing contact one against the other after connection of the two threaded components by makeup are respectively provided on the male and female ends close to the threaded portions 3, 4. Finally, the male end 1 ends in a terminal surface 7 which abuts against a corresponding surface 8 provided on the female end 2 when the two ends are made up one into the other. The surfaces 7 and 8 are termed abutment shoulders.

FIG. 3 shows a detail of a thread of a threaded portion. Each thread thus comprises a load flank 11 forming an angle 12 in the range −5° to +5° with respect to the normal N to the connection axis 10. The load flank is connected via a crest 13 to a stabbing flank 14. In particular, the connection shown is such that in the final position of the connection, the load flanks of the male threaded portion 3 are in contact with the corresponding load flanks of the female threaded portion 4.

FIG. 4 shows the male end 1 of a tubular component in which the threaded portion 3 and the sealing surface 5 (bearing surface) are overlaid with a coating 15 as defined in the invention.

EXAMPLE

A metallic coating of a principal layer of a nickel-phosphorus alloy comprising 11% by weight of phosphorus, and an additional layer of a nickel-phosphorus alloy comprising polytetrafluoroethylene (PTFE) particles in an amount of 25% by volume with respect to the volume of the alloy, was produced on a L80 grade carbon steel threading.

The principal layer was deposited using the autocatalytic method proposed by the company MACDERMID with the trade name NiKlad™ ELV.

The additional layer was deposited using the autocatalytic method proposed by the company MACDERMID with the trade name NiKlad™ ICE ULTRA.

The principal nickel-phosphorus layer was 29 µm thick. The additional nickel-phosphorus-PTFE layer was 7.4 µm thick.

The metallic composite deposit obtained had a hardness of at least 550 Hk under 10 g.

The metallic composite deposit had very good corrosion resistance.

Tests were carried out on the shore at a marine industrial exposure site (port of Dunkirk) classed as level 4 (high) on a scale of up to C5 (see "Corrosivity Class" in accordance with ISO standard 9223).

After 12 months exposure in Dunkirk with a protector, no signs of rust were observed.

After 12 months exposure in Dunkirk without a protector, a few rare spots of corrosion were observed (Re 1 on the European scale for degree of rusting, ISO 4628-3).

After 24 months exposure in Dunkirk with a protector, no signs of rust were observed.

The metallic composite deposit was not damaged during a scratch test type test where it was subjected to an increasing load from 10N to 300N provided by a tungsten carbide bead with a diameter of 5 mm. In contrast to other metallic deposits (Cu—Sn—Zn alloy type), the deposit does not crack; no detachment or delamination of the coating was observed.

The metallic composite deposit had excellent anti-galling performances.

Laboratory tests (Vee block test with a constant 785N load, equivalent to a contact pressure of 500-600 MPa, characteristic of the contact pressures occurring during makeup of a connection at the threads) exhibited highly progressive wear during use of nickel-phosphorus supplemented with PTFE compared with a metallic deposit of a ternary Cu—Sn—Zn alloy.

Makeup curves very similar to those obtained with an API grease were obtained: highly regular slopes (not bumpy), with clearly identifiable changes in the slope.

Corrosion tests according to ISO Standard 9227—Corrosion tests in artificial atmospheres or salt spray tests—have been carried out on a sample corresponding to the example described above (noted with sample reference "D") and was compared to samples with various thicknesses of constituting layers. All the samples are L80 grade carbon steel threaded elements overlaid with a principal layer of a nickel-phosphorus alloy comprising 11% by weight of phosphorus, and an optional additional layer of a nickel-phosphorus alloy comprising polytetrafluoroethylene (PTFE) particles in an amount of 25% by volume with respect to the volume of the alloy.

All those samples have been exposed to neutral spray test (NSS) for at least 1000 hours, Results are given according to ISO standard 9227, on a European scale with levels of rust ranging from Re0 to Re9; level Re0 corresponding to a 0% rusted surface; Re3 corresponding to a 1% rusted surface; Re5 corresponding to a 8% rusted surface; Re6 corresponding to a 40%-50% rusted surface.

| Sample reference | Coating | Rust level after 500 h exposure (Re scale) | Rust level after 1000 h exposure (Re scale) |
|---|---|---|---|
| A | One principal layer NiP from 25 µm to 31 µm | 4.5 | 6 |
| B | One principal layer NiP from 15 µm to 20 µm and one additional layer of NiP-PTFE from 5 µm to 10 µm | 3 | 4.5 |
| C | One principal layer NiP from 20 µm to 25 µm and one additional layer of NiP-PTFE from 5 µm to 10 µm | 2.6 | 4.5 |
| D | One principal layer NiP from 25 µm to 30 µm and one additional layer of NiP-PTFE from 5 µm to 10 µm | 2.3 | 2.8 |

The sample D with a coating comprising a principal layer of Nickel—Phosphorus alloy having a thickness in the range 25 µm to 30 µm and an additional layer of Nickel Phosphorus comprising particles of PTFE lubricant presents an excellent behaviour to corrosion.

The invention claimed is:

1. A connecting element for a tubular component, overlaid with a coating comprising:
   a principal layer consisting of a nickel-phosphorus alloy, and
   an additional layer constituted by the nickel-phosphorus alloy comprising particles of one or more solid lubricant compounds, the additional layer being disposed on the principal layer,
   wherein phosphorous represents 10.5% to 11.5% by weight of a total weight of the nickel-phosphorous alloy.

2. A connecting element according to claim 1, wherein a thickness of the principal layer constituted by the nickel-phosphorus alloy is in a range of 5 to 10 µm.

3. A connecting element according to claim 1, wherein a thickness of the principal layer constituted by the nickel-phosphorus alloy is in a range of 15 to 35 µm.

4. A connecting element according to claim 1, wherein the particles of one or more solid lubricant compounds are one or more particles selected from a list consisting of polytetrafluoroethylene, talc, mica, boron nitride, silicon carbide, tungsten carbide, tungsten sulphide, molybdenum sulphide.

5. A connecting element according to claim 1, wherein the particles of one or more solid lubricant compounds represent 20% to 35% by volume with respect to a total volume of the nickel-phosphorus alloy comprising the particles of one or more solid lubricant compounds.

6. A connecting element according to claim 1, wherein a thickness of the additional layer constituted by a nickel-phosphorus alloy comprising the particles of one or more solid lubricant compounds is in a range of 3 to 13 µm.

7. A connecting element according to claim 1, wherein the coating comprises a lubricant layer disposed on the principal layer or on the additional layer when the coating comprises the additional layer.

8. A connecting element according to claim 7, wherein the lubricant layer is selected from a grease, a semi-solid lubricant layer or a solid, dry lubricant layer comprising one or more solid lubricant particles in a resin.

9. A connecting element according to claim 1, which is a threading.

10. A connecting element according to claim 1, which is a sealing surface.

11. A connecting element according to claim 1, which is an abutment shoulder.

12. A tubular component comprising one or more connecting elements as defined in claim 1.

13. A tubular component according to claim 12, wherein the one or more connecting elements is a threading.

14. A tubular component according to claim 12, wherein the one or more connecting elements is a sealing surface.

15. A tubular component according to claim 12, wherein the one or more connecting elements is an abutment shoulder.

16. A method for obtaining a connecting element as defined in claim 1, comprising depositing the principal layer and the optional additional layer by autocatalytic deposition.

17. A method according to claim 16, further comprising posterior treatment at a temperature in a range of 250° C. to 300° C.

18. A method according to claim 16, further comprising posterior treatment at a temperature in a range of 300° C. to 600° C.

19. An assembly of a first tubular component and a second tubular component, the first tubular component including a threaded male portion, the second tubular component including a correspondingly threaded female portion configured to accommodate the male portion, one of the threaded male portion and the threaded female portion overlaid with a coating comprising:

a principal layer consisting of a nickel-phosphorus alloy, and an additional layer constituted by the nickel-phosphorus alloy comprising particles of one or more solid lubricant compounds, the additional layer being disposed on the principal layer, wherein phosphorous represents 10.5% to 11.5% by weight of a total weight of the nickel-phosphorous alloy.

* * * * *